May 19, 1970     G. G. ROBERTS     3,512,339
STIRRUP CUSHION
Filed Jan. 15, 1968

INVENTOR
Gerald G. Roberts

BY *Scofield, Hajjar, Scofield & Lowe*
ATTORNEYS

United States Patent Office 3,512,339
Patented May 19, 1970

3,512,339
STIRRUP CUSHION
Gerald G. Roberts, Box 505, Abilene, Kans. 67410
Filed Jan. 15, 1968, Ser. No. 698,012
Int. Cl. B68c 03/00
U.S. Cl. 54—48      2 Claims

ABSTRACT OF THE DISCLOSURE

A shock absorbing assembly comprised of a plurality of interiorly mounted springs acting against a tubular sleeve, said springs and sleeve encased within a rectangular cage having open ends. The assembly rotatably mounted on a stirrup bolt communicating between the upper ends of a substantially U-shaped stirrup, said stirrup bolt passing through said sleeve. Jolting motion of the rider's body acting against the stirrup is transmitted to the saddle through the shock absorbing assembly thereby cushioning the effect of the rider's body being jolted up and down in the stirrups.

BACKGROUND OF THE INVENTION

This invention relates to a stirrup mounted shock absorber for minimizing the unpleasant jolts usually experienced in horseback riding. Depending upon the gait of the horse, the rider is bounced up and down in the saddle with little more than his own reflexes to cushion the ride. Experienced riders learn to place a major portion of their body weight on the saddle stirrups thereby absorbing most of the shock in the knee joints. The knees are able to flex in rhythm with the jerking motion of the horse and thereby absorb the majority of the impact of the rider's body bouncing against the saddle. Nevertheless, even the experienced rider is unable to smooth out all the shocks and a day in the saddle for even a top rider such as an experienced ranch hand or bronco trainer can be extremely tiring. For the experienced rider who has not learned to synchronize his body motion with that of the horse, a ride of an hour or so often produces numerous muscle aches and bruises.

My invention is a major improvement for cushioning horseback riding for both the experienced hand and the novice. For the experienced hand who places a major part of his weight in the stirrups, much of the shock action which heretofore had to be absorbed by the knees is now absorbed by a plurality of compression springs in each stirrup. This same spring action also helps the inexperienced rider to learn the rhythm of the horse and provides him with the same shock absorbing benefits of the experienced rider. The horse is also benefited in that the impact of the rider's body against his withers is substantially reduced. Thus horseback riding is made significantly more enjoyable and less tiring for both the pleasure rider and the professional.

SUMMARY OF THE INVENTION

This invention is a stirrup mounted shock absorbing assembly comprised essentially of a plurality of springs acting against a tubular sleeve all of which are encased within a substantially rectangular cage. The cage is designed to be mounted on the stirrup bolt communicating between the upper extensions of a substantially U-shaped saddle stirrup. The saddle strap for attaching the stirrup to the saddle engages the cage in such a manner that the load on the stirrup is transferred to the saddle through the shock absorbing springs.

The object of this invention is to provide a spring loaded assembly for absorbing a major portion of the shock normally associated with the horseback ride.

Still another object of this invention is to provide a spring loaded assembly to fit between the saddle strap and the stirrup bolt on the standard U-shaped saddle stirrup that will cushion the ride of both the experienced and inexperienced rider and will assist the inexperienced rider in learning the rhythm of the horse.

Still a further object of this invention is to provide a shock absorbing assembly that can be installed or removed from a conventional U-shaped saddle stirrup, said removal and installation being extremely simple and fast.

Still another object of this invention is to provide a cushioning means for mounting on a saddle stirrup that can be inactivated without removing the entire device from the stirrup.

Still another object of this invention is to provide an extremely simple device for cushioning the ride of a horse which is both inexpensive and can be readily repaired in the event of spring failure.

Still another object of this invention is to provide a stirrup mounted device for cushioning the ride of a horse which has the safety feature of maintaining engagement of the stirrup in the event of failure of said device.

Other and further objects of this invention shall appear in the course of the following description thereof.

DETAILED DESCRIPTION

In the accompanying drawings which form a part of the instant specification and are to be read in conjunction therewith like numerals are employed to indicate like parts.

Figure 1:
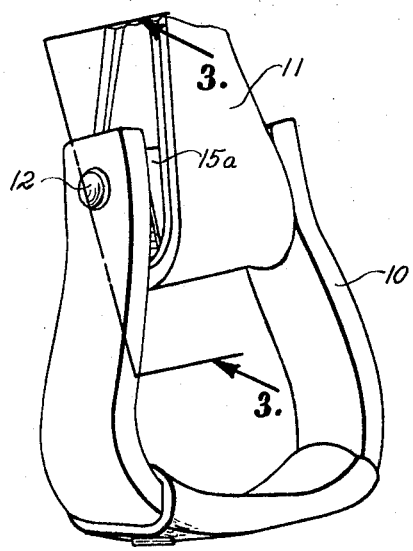
FIG. 1 is a three quarter perspective view of a stirrup and stirrup engaging saddle straps showing the engagement of a shock absorbing assembly.

Turning now to the drawings in detail FIG. 1 shows a conventional U-shaped stirrup 10 of the type most commonly used with the Western type saddle (not shown). This stirrup is attached to the saddle by a strap 11 forming a loop engaging a stirrup bolt 12 communicating with the shock absorbing assembly, which is the subject of this invention. The latter is mounted on the stirrup bolt as shown in FIG. 2, and separates the bolt and the saddle strap.

Figure 2:
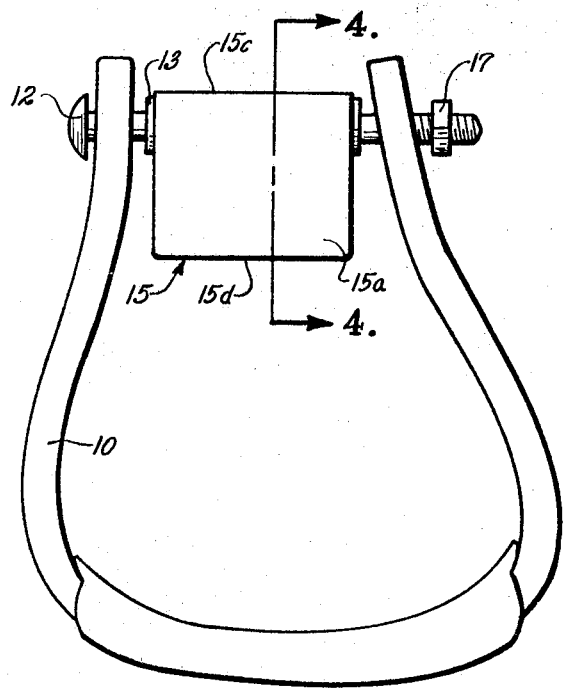
FIG. 2 is an elevational view of the stirrup removed from the saddle and showing the shock absorbing assembly in place.
Figure 3:
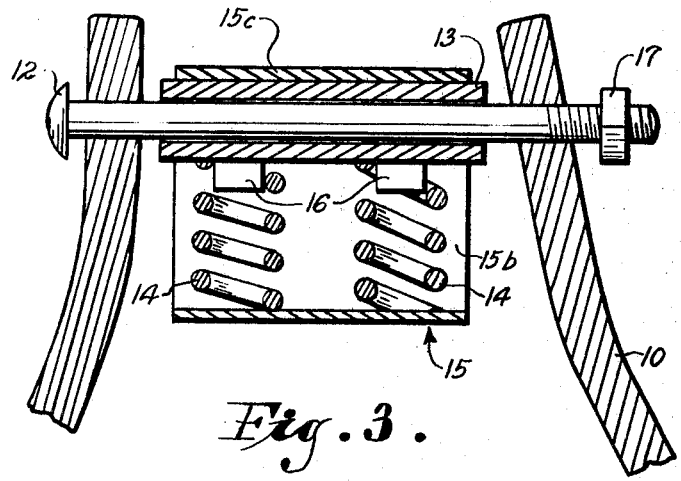
FIG. 3 is a partial sectional view along line 3—3 of FIG. 1 illustrating in particular the interior springs and spring mounting features.
Figure 4:
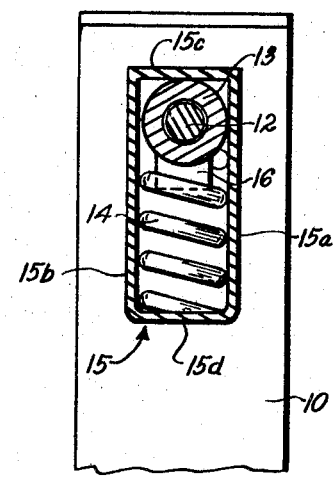
FIG. 4 is a partial sectional view through 4—4 of FIG. 2 in the direction of the arrows showing an end view of the same springs and mounting features as illustrated in FIG. 3.

The shock absorbing assembly as shown in detail in FIGS. 3 and 4 comprises essentially a tubular sleeve 13 and a plurality of compression springs 14 interiorly mounted within a rectangular cage 15. The cage is of rigid construction with open end walls providing ready access to the springs and permitting sliding motion of the sleeve 13, the ends of which project slightly beyond the cage walls as shown in FIGS. 2 and 3. The travel of the sleeve is guided by confronting interior side walls 15a and b of the cage which slidingly engage the sleeve tangentially along its outer perimeter. One end of the compression springs 14 perpendicularly abut against the periphery of the sleeve so as to urge it against a third interior wall 15c of the cage. The opposite end of the springs abut against a fourth interior wall 15d of the cage, and are maintained in position by circumferentially engaging lugs 16 projecting from the sleeve. These lugs are spaced along the periphery of the sleeve in position to provide balanced loading along the length of the sleeve.

To mount the shock assembly on the stirrup as shown in FIGS. 2 and 3 the fastening nut 17 on the end of the stirrup bolt 12 is removed, and the bolt withdrawn from one side wall of the stirrup 10. The shock absorbing device is then placed in position between the ends of the stirrup, and the bolt is fed through the sleeve 13 and back through the stirrup wall. The fastening nut 17 is fed back on the stirrup bolt and the assembly is completed. The sleeve loosely fits the stirrup bolt so that the entire assembly may be rotated, thereby permitting free pivotal motion of the stirrup. This feature also permits inactivation of the shock absorbing springs by a technique that will be described in detail later.

As the rider yieldingly inserts his foot into this stirrup 10 for mounting the horse, the load of his body acts to compress the springs 14 which are positioned between the stirrup bolt and the loop formed by the saddle strap 11. In the embodiment of the invention shown each shock absorbing assembly is designed to require a 100 pound load to fully compress the springs, thus the weight of a 200 pound man evenly distributed between both stirrups of a conventional saddle would just fully compress the springs. As the horse takes up his gait and the rider's body moves in sympathy with the rocking motion of the horse, the compression springs similarly respond to the varying load on the stirrups. The spring action accompanying the load changes acts much like the shock absorbing action of the springs used in conventional automobiles to cushion the ride. Thus, instead of the rider's body being roughly bounced about in the saddle, the springs serve to dampen the body motion and thereby yield a substantially much more comfortable ride.

In order to inactivate the action of the springs it is a simple matter to rotate the entire assembly on the stirrup bolt 12 approximately 180° so that the springs 14 no longer are between the stirrup bolt 12 and the lower loop portion of the saddle strap 11. The strap now engages the end of the cage 15 nearest the sleeve 13 and the relationship between the saddle and the stirrup is approximately the same as if the shock absorbing assembly were removed.

In the event of spring failure, it can be seen in FIG. 1 that the saddle strap 11 still engages the stirrup 10. This is a highly important safety feature since most riders depend upon the stirrups to maintain their balance in the saddle. Replacement of the springs 14 is a simple operation since, as was mentioned above, the ends of the cage are left entirely open. Thus the old spring 14 need only be slipped off the positioning lug 16 and removed through the end of the cage 15. A new spring can be inserted in a reverse manner all of which can be done without removing the assembly from the stirrup.

It is readily apparent that this is an extremely useful and versatile invention. Horseback riding for both experienced and inexperienced riders is made significantly more pleasant.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A rotatable shock absorbing device for use in combination with a saddle and a standard, substantially U-shaped saddle stirrup, said saddle including a saddle strap forming a depending loop for attaching said stirrup to said saddle, and said stirrup having upright ears and including a stirrup bolt laterally communicating between the upper ends of said upright ears; said device comprising:
   an open rigid cage rectangular in shape and defined by vertical side walls closed by horizontal end walls providing a rectangular opening therethrough laterally aligned with said upright ears,
   a tubular sleeve longitudinally and slidably housed within said cage through said rectangular opening and rotatably received between said upright ears by said stirrup bolt and maintained therebetween by lateral confinement of said upright ears,
   a plurality of compression springs housed within said cage, each of said springs having one end thereof abutting the interior surface of one end wall of said cage and the opposite end thereof abutting the peripheral surface of said sleeve, thereby urging said one end wall abutted by said springs away from said sleeve to bias the opposite end wall against said sleeve,
   said device positionable normally with said springs located beneath said stirrup bolt and the exterior surface of said one end wall abutted by said springs engaged against the depending loop of said saddle strap whereby, as load is applied to said stirrup, said springs are compressed between said one end wall and said sleeve in an amount proportional to the load applied,
   said device manually rotatable about said stirrup bolt and within said depending loop to an inverted position in which said springs are located above said stirrup bolt and the exterior surface of the end wall of said cage biased to said sleeve engages said depending loop whereby, as load is applied to said stirrup, said springs are not compressed and the shock absorbing function of said device is rendered inoperable.

2. A shock absorbing device as claimed in claim 1 wherein a plurality of lugs project from the periphery of said sleeve,
   said lugs aligned parallel with one another and each circumferentially engaged by one of said compression springs.

References Cited

UNITED STATES PATENTS

| | | | |
|---|---|---|---|
| 135,547 | 2/1873 | Herring | 54—48 |
| 409,558 | 8/1889 | Bull | 54—48 |
| 807,000 | 12/1905 | Southworth | 54—48 |
| 1,197,681 | 9/1916 | Stine | 54—48 |

HUGH R. CHAMBLEE, Primary Examiner